United States Patent [19]
Nitta

[11] Patent Number: 5,682,417
[45] Date of Patent: Oct. 28, 1997

[54] POWER SAVING MOBILE DATA COMMUNICATION SYSTEM USING ADAPTORS

[75] Inventor: Toshio Nitta, Tokyo, Japan

[73] Assignee: NEC Corporation, Tokyo, Japan

[21] Appl. No.: 454,744

[22] Filed: May 31, 1995

[30] Foreign Application Priority Data

May 31, 1994 [JP] Japan .................................. 6-118104

[51] Int. Cl.$^6$ .................. H04Q 7/18; H04Q 7/36
[52] U.S. Cl. .................... 379/58; 379/59; 455/33.1; 455/38.3; 455/34.3; 370/311
[58] Field of Search .................... 379/58, 59, 93, 379/98, 100, 63; 455/33.1, 38.3, 54.1, 127, 34.3, 58.2, 343; 370/311

[56] References Cited

U.S. PATENT DOCUMENTS

| | | | |
|---|---|---|---|
| 4,654,867 | 3/1987 | Labedz et al. | 379/59 |
| 4,903,335 | 2/1990 | Shimizu | 455/343 |
| 4,912,756 | 3/1990 | Hop | 379/59 X |
| 5,237,429 | 8/1993 | Zuiss et al. | 358/442 |
| 5,276,680 | 1/1994 | Messenger | 455/54.1 X |
| 5,511,237 | 4/1996 | Sakaguchi | 379/63 X |
| 5,590,396 | 12/1996 | Henry | 455/33.1 |

FOREIGN PATENT DOCUMENTS 60-64564  4/1985  Japan .

*Primary Examiner*—Dwayne Bost
*Assistant Examiner*—Nay Maung
*Attorney, Agent, or Firm*—Sughrue, Mion, Zinn, Macpeak and Seas

[57] ABSTRACT

In a cellular mobile communication system, a first adaptor is connected to a data terminal to convert the output of the modem of the data terminal to a baseband data signal, and determines the absence or presence of the baseband data signal and produces a data absence signal or a data presence signal. A mobile unit is connected to the first adaptor to transmit the baseband data signal or the data absence signal on a voice frequency carrier to one of cellsite base stations, deactivates itself following the transmission of the data absence signal, and reactivates itself in response to the data presence signal. A second adaptor is connected to a mobile telephone switching system for receiving the baseband data signal and the data absence signal. The second adaptor includes an idle flag generator responsive to the data absence signal for generating an idle flag until it receives a baseband data signal. A modem is provided in the second adaptor for modulating the idle flag or baseband data signal on a voice frequency carrier. The mobile telephone switching system is responsive to a dialing signal from the mobile unit for establishing a connection from the base station to the input of the second adaptor and a connection from the output of the second adaptor to a destination terminal via a public switched telephone network to transmit the modulated carrier from the second adaptor.

4 Claims, 2 Drawing Sheets

ADAPTOR 12

ADAPTOR 19

POWER SAVING MOBILE DATA COMMUNICATION SYSTEM USING ADAPTORS

BACKGROUND OF THE INVENTION

1. Field of the Invention

The present invention relates to a mobile communication system operating in a data transmission mode.

2. Description of the Related Art

Japanese Provisional Patent Publication Sho-60-116239 describes a power savings technique for mobile communication systems. According to the power savings technique, the voice level of a mobile unit is determined and the power of the unit is turned off during a pause between speech transmissions.

However, power savings techniques are not employed in a mobile data communication system. It is thus desirable to provide mobile units with power savings capability when operating in a data communication mode.

SUMMARY OF THE INVENTION

It is therefore an object of the present invention to provide a power savings technique for a mobile unit operating in a data communication mode.

According to a first aspect of the present invention, there is provided a mobile communication system wherein a plurality of cellsite base stations are connected to a mobile telephone switching system which controls the base stations to receive signals from and transmit signals to the base stations. The system includes a data terminal having a computer and a modem connected thereto and a first adaptor connectable to the modem. The first adaptor converts a signal from the modem to a baseband data signal, and determines the absence or presence of the baseband data signal and produces a data absence signal or a data presence signal. A mobile unit is connected to the first adaptor for establishing a connection to one of the base stations. The mobile unit transmits the baseband data signal or the data absence signal on a voice frequency carrier to that base station, deactivates the unit following the transmission of the data absence signal, and reactivates the unit in response to the data presence signal. A second adaptor is connected to the mobile telephone switching system for receiving the baseband data signal and the data absence signal. The second adaptor includes an idle flag generator responsive to the data absence signal for generating an idle flag until it receives a baseband data signal. A modem is provided in the second adaptor for modulating the idle flag or baseband data signal on a voice frequency carrier. The mobile telephone switching system is responsive to a dialing signal from the mobile unit for establishing a connection from the base station to the input of the second adaptor and a connection from the output of the second adaptor to a destination modem via a public switched telephone network.

According to a second aspect, the present invention provides an adaptor for a mobile unit of a mobile communication system wherein a plurality of cellsite base stations are connected to a mobile telephone switching system which controls the base stations. The adaptor comprises a demodulator for converting a signal from a data terminal to a baseband data signal and means for detecting the absence or presence of the baseband data signal and producing therefrom a data absence signal or a data presence signal. The mobile unit transmits the baseband data signal or the data absence signal on a voice frequency carrier to one of the base stations, deactivates itself following the transmission of the data absence signal, and resumes operation in response to the data presence signal.

BRIEF DESCRIPTION OF THE DRAWINGS

The present invention will be described in further detail with reference to the accompanying drawings, in which.

DETAILED DESCRIPTION

Figure 1:
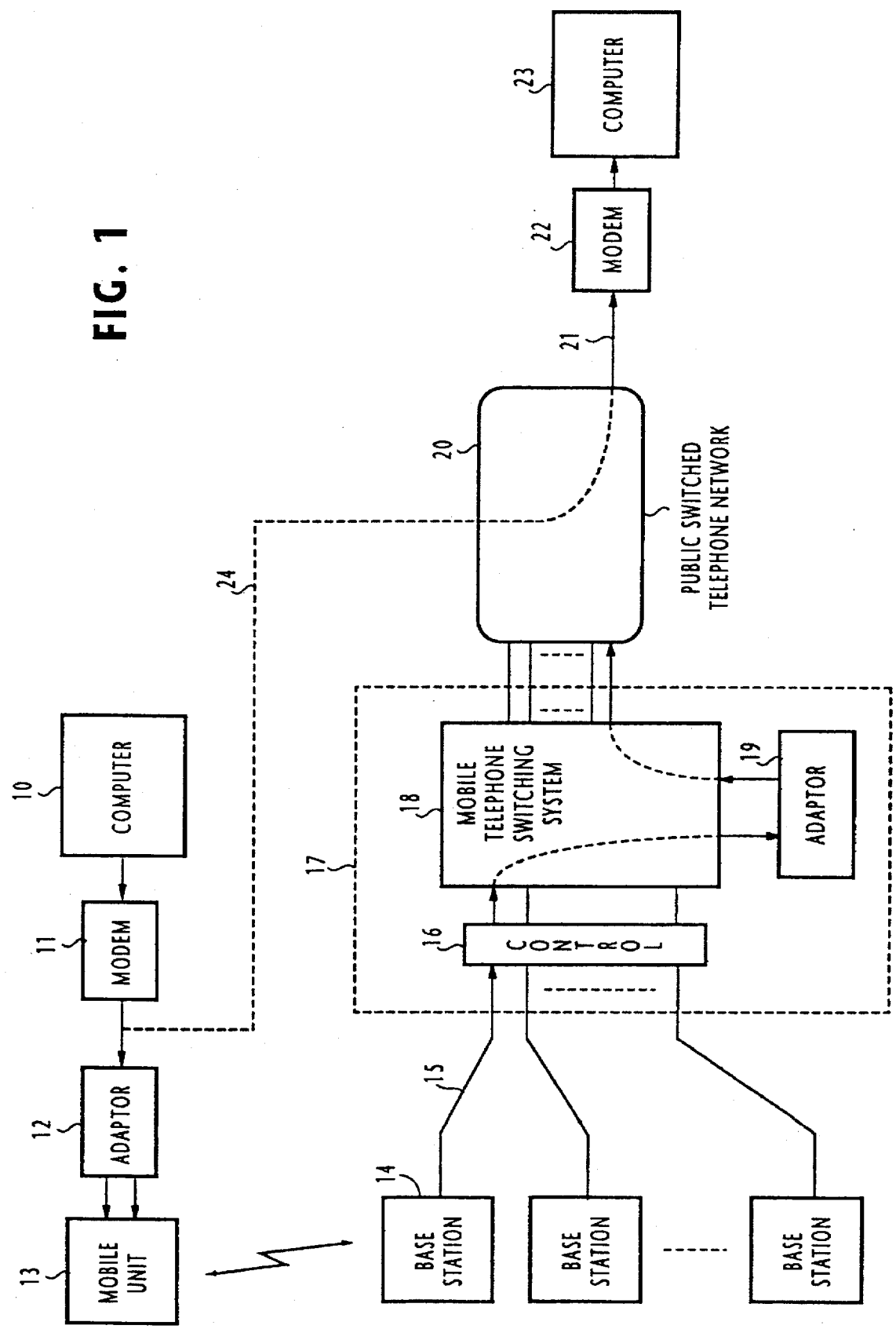
FIG. 1 is a block diagram of a battery-saving mobile communication system according to the present invention.

Referring now to FIG. 1, there is shown a cellular mobile communication system according to the present invention. The system shown in FIG. 1 is in a data communication mode in which a mobile-side adaptor 12 is connected between a battery-saving mobile unit 13 and a conventional modem 11 that is usually employed for interfacing a computer 10 to a subscriber telephone line. A plurality of cellsite base stations 14 are connected via transmission lines 15 to a cellsite controller 16 of a mobile telephone switching office 17 in which the mobile telephone switching system 18 is provided to perform overall control on the base stations and establish switched connections between the base stations and a public switched telephone network (PSTN) 20. Usually, the computer 10 may be connected through modem 11 via a subscriber loop 24 to the PSTN 20 for establishing a data communication channel to a remote destination computer 23 via a subscriber loop 21 and a modem 22.

A system-side adaptor 19 is connected to the switching system 18. Switching system 18 is responsive to a dialing signal from the mobile unit 13 to establish an incoming connection between the cellsite controller 16 and the input of adaptor 19 and an outgoing connection between the output of adaptor 19 and the PSTN 20 to establish a data communication channel between the cellsite controller 16 and the PSTN 20 via the adaptor 19 when the mobile unit 13 desires to send computer data to the distant computer 23.

Figure 2:
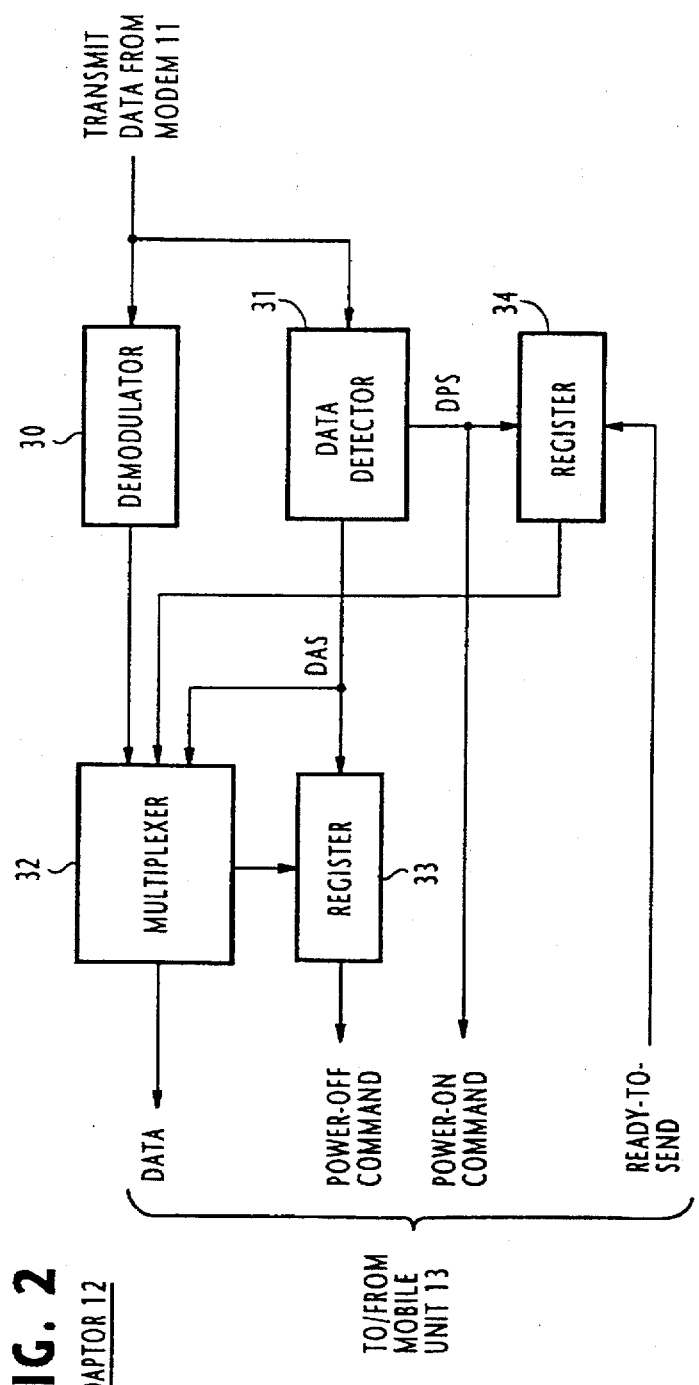
FIG. 2 is a block diagram of an adaptor to be used on the mobile-side of the system to enable transmission of data from a mobile unit in a battery saving mode.

Details of the mobile-side adaptor 12 are illustrated in FIG. 2. Mobile-side adaptor 12 includes a demodulator 30 which is coupled to the output of the modem 11 for converting the modulated voice frequency carrier to the original baseband digital signal. A data detector 31 is also connected to the output of modem 11 to produce a digital code indicating the presence or absence of a data bit stream on the carrier output of modem 11. The data absence signal is applied to a multiplexer 32 and a register 33. The register 33 is triggered in response to a ready-to-turn-off signal from the multiplexer 32 to apply the stored signal to the mobile unit 13 as a power-off command to initiate a battery saving mode.

The output signal of demodulator 30 is also applied to the multiplexer 32, where it is combined with the data presence and absence signals from data detector 31 into a frame format, which is applied to the mobile unit 13 for transmission over a radio speech channel to a nearby base station 14.

Following the transmission of a data absence signal to the base station 14, the multiplexer 32 triggers the register 33 and the stored data absence signal is forwarded to the mobile unit 13. Mobile unit 13 receives this signal as a power off command to turn off its power off and the system enters a power savings mode.

When resuming a data communication mode, a data presence signal is applied from data detector 31 to the mobile unit 13 as a power-on command, as well as to a register 34 to turn its power on. The output of register 34 is applied to the multiplexer 32 in response to a ready-to-send command from the mobile unit 13 to resume data transmission mode when the power savings mode is terminated.

Figure 3:
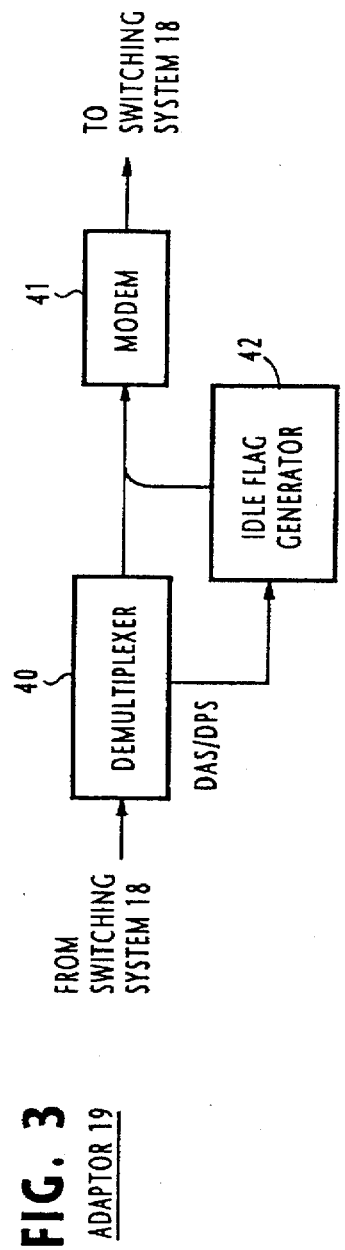
FIG. 3 is a block diagram of an adaptor to be used with a mobile telephone switching system.

As shown in FIG. 3, the system-side adaptor 19 includes a demultiplexer 40, a modem 41 and an idle flag generator 42. Demultiplexer 40 is connected to the switching system 18 to receive signals from the basestation 14 through controller 16 to detect the digital data presence or absence signal and data signal. The data presence or absence signal is applied the idle flag generator 42 and the data signal is applied to a modem 41 where it is modulated on a voice frequency carrier for transmission to the destination terminal through the switching system 18 to the PSTN 20. The idle flag generator 42 is responsive to the data absence signal to produce a High Level Data Link Control HDLC idle flag pattern and applies it to the modem 41 for transmission to the destination. If the data presence signal is applied, the idle flag generator 42 ceases to generate the idle flag.

At the destination terminal, the idle flag pattern from the system-side adaptor 19 is received by the computer 23 through modem 22 and it enters a waiting state while maintaining the logical connection to the source computer 10.

When the source computer 10 restarts transmitting a data bit stream, the data detector 31 produces a data presence signal. The mobile unit 13 is turned on again, and returns a ready-to-send command to the register 34 so that the data presence signal is applied to the multiplexer 32 and transmitted to the idle flag generator 42 of the system-side adaptor. Idle flag generator 42 ceases transmission of the idle flag and the data bit stream from the source computer 10 is received by the modem 41 and transmitted to the destination computer 23.

What is claimed is:

1. A mobile communication system wherein a plurality of cellsite base stations are connected to a mobile telephone switching system which controls said base stations to receive signals from and transmit signals to the base stations, comprising:

a data terminal including a computer and a modem connected to the computer;

a first adaptor connectable to the modem and including a demodulator for converting a signal from the modem to a baseband data signal, and means for detecting the absence or presence of the baseband data signal and producing a data absence signal or a data presence signal;

a mobile unit connected to the first adaptor for establishing a connection to one of said base stations, transmitting the baseband data signal or the data absence signal on a carrier to said one base station, deactivating the mobile unit following the transmission of the data absence signal, and reactivating the mobile unit in response to the data presence signal; and a second adaptor having an input terminal and an output terminal connected to the switching system for receiving said baseband data signal and said data absence signal, the second adaptor including an idle flag generator responsive to the data absence signal for generating an idle flag and ceasing the generation of the idle flag upon receipt of the baseband data signal, and a modem for modulating the baseband data signal and the idle flag on a carrier and transmitting the carrier through the output terminal to the switching system, said mobile telephone switching system being responsive to a dialing signal from said mobile unit for establishing a connection from said one base station to the input terminal of the second adaptor and a connection from the output terminal of the second adaptor to a destination modem via a public switched telephone network.

2. An adaptor for a mobile unit of a mobile communication system wherein a plurality of cellsite base stations are connected to a mobile telephone switching system which controls said base stations, said adaptor comprising:

a demodulator for converting a signal from a data terminal to a baseband data signal; and means for detecting the absence or presence of the baseband data signal and producing therefrom a data signal or a data presence signal, said mobile unit transmitting the baseband data signal or the data absence signal on a carrier to one of said base stations, deactivating the mobile unit following the transmission of the data absence signal, and reactivating the mobile unit in response to the data presence signal.

3. An adaptor circuit having an input connected to an output of a modem, and an output connected to an input of a mobile unit, said adaptor circuit comprising:

a data detector circuit for producing data codes indicating the presence and absence, respectively, of data bit stream from said output of said modem;

a multiplexer receiving said data bit stream from said modem and said data codes from said data detector circuit, said multiplexer combining said data bit stream and said data codes in a frame format to thereby produce a multiplexed signal; and a register for sending a power off command to said mobile unit whenever said data detector detects an absence of data bit stream from said modem;

wherein said mobile unit transmits said data code indicating absence of data and enters a battery saving mode upon receiving said power off command from said register.

4. A communication system comprising the adapter circuit of claim 3, and further comprising a second adapter circuit connected to a mobile telephone switching system having a computer connected thereto, said second adapter circuit comprising:

a demultiplexer receiving a signal from a base station via said mobile telephone switching system, and separating data codes indicating data presence or absence, respectively; and an idle flag generator receiving said separated data codes, said idle flag generator being responsive to said data code indicating an absence of data to generate an idle flag pattern, and further being responsive to said data code indicating presence of data to cease generating said idle flag pattern;

wherein said computer being responsive to said idle flag pattern to enter a waiting state while maintaining a connection to the mobile unit.

* * * * *